United States Patent [19]  [11]  4,304,474
Stein  [45] * Dec. 8, 1981

[54] ARRANGEMENT FOR FOCUSING THE IMAGE OF AN OBJECT ONTO AN IMAGE PLANE

[75] Inventor: Karl-Ulrich Stein, Munich, Fed. Rep. of Germany

[73] Assignee: Siemens Aktiengesellschaft, Berlin & Munich, Fed. Rep. of Germany

[*] Notice: The portion of the term of this patent subsequent to Sep. 22, 1998, has been disclaimed.

[21] Appl. No.: 20,812

[22] Filed: Mar. 15, 1979

[30] Foreign Application Priority Data

Mar. 31, 1978 [DE] Fed. Rep. of Germany ........ 2813914

[51] Int. Cl.³ .................. G03B 13/18; G01J 1/36; G01C 3/08; G01P 3/36
[52] U.S. Cl. ........................... 354/25; 354/31; 354/60 E; 250/204; 356/1; 356/4; 356/28
[58] Field of Search ............... 354/25, 31, 163, 60 L, 354/198, 60 E; 352/140; 250/201, 204; 356/1, 4, 5, 28; 358/105, 213

[56] References Cited

U.S. PATENT DOCUMENTS 3,617,128 11/1971 Harvey ............... 354/163 X
3,844,658 10/1974 Gela et al. ............. 354/163
3,945,023 3/1976 Stauffer ................. 354/25
4,004,852 1/1977 Pentecost ............ 250/201 X
4,059,756 11/1977 Wilwerding ............ 354/25
4,171,155 10/1979 Jyojiki et al. ........... 354/25
4,173,402 11/1979 Hurike et al. ........... 354/25

FOREIGN PATENT DOCUMENTS 2722804 8/1977 Fed. Rep. of Germany ........ 354/25

Primary Examiner—L. T. Hix
Assistant Examiner—William B. Perkey
Attorney, Agent, or Firm—Hill, Van Santen, Steadman, Chiara & Simpson

[57] ABSTRACT

The invention relates to an arrangement for automatically focusing the image of an object, obtained by an objective lens system, onto an image plane by adjustment of the distance of the objective lens system or a portion thereof from such image plane. Two optical devices which are mutually offset transversely to the optical axis, are provided for obtaining auxiliary images of the object, which are photoelectrically analyzed with respect to one another. The minimum difference signal therebetween indicates the congruency of the two auxiliary images and supplies an adjustment criterion for a device operative to correspondingly adjust the objective distance. The invention utilizes two CTD image sensors to analyze the auxiliary images with the read-out signals being supplied to a differential amplifier and subsequently rectified and integrated. The read-out signals of one sensor are modified, as to their phase state with respect to the output signals of the other sensor, by adjusting movement of the relevant optical device, or by means of a delay element, which can be adjusted in step-like fashion. The phase state associated with the minimal difference signal represents the setting criterion. The invention can be utilized in photographic cameras and the like and, in particular, those with additional range and flash or speed facilities.

24 Claims, 7 Drawing Figures

ARRANGEMENT FOR FOCUSING THE IMAGE OF AN OBJECT ONTO AN IMAGE PLANE

BACKGROUND OF THE INVENTION

The invention relates to an arrangement for focusing the image of an object onto an image plane, in which the image is derived from an objective lens system, adapted to be adjusted by a setting device, employing two optical devices which are offset, with respect to one another, transversely to the optical axis, and which is provided with a device which analyzes the two resulting auxiliary images, in the form of electrical signals, and serves to control the adjusting device.

A general arrangement of this type is basically described in the magazine "Popular Photography", volume 78, No. 1, 1976, pages 92, 94 and 134, including the illustration on page 92 thereof. In the described arrangement, the two auxiliary images, one of which is obtained by means of a rotatable mirror coupled to the range adjusting mechanism of the objective lens system, are each reflected upon a photo-detector. When the rotatable mirror has reached the position in which congruent auxiliary images are obtained over both optical devices, the objective distance from the image plane is also set to a value at which the resultant image of the object, derived over the objective lens system, is focused onto the image plane.

Another known device of this type, in which the two auxiliary images are obtained over two subsidiary optical openings or pupils which supply different subsidiary areas of the entrance pupil of the objective lens system, is described in a magazine: "Electronic Focusing for Cameras of the Future", published by Ernest Leitz GmbH, Wetzlar, List 100-22, IX/76/LX/Bm in 1976.

The disadvantage of the known arrangements is that each of the photo-detectors produces an electrical signal which is obtained by integration over the brightness values of the overall image content. The congruency of the two auxiliary images produced by comparing two such signals cannot be established with a high degree of accuracy.

BRIEF SUMMARY OF THE INVENTION

The invention has as a principal objective an improvement upon the known arrangements of the type referred to with respect to the accuracy which can be achieved in the adjustment of the optimum distance of the objective lens system.

This is achieved, in accordance with the invention, by an arrangement in which two optical devices are provided, which are offset from one another transversely to the optical axis, and which supply two auxiliary images of the object, one of which optical devices includes a rotatably mounted mirror, the rotation of which is coupled to the elements for adjusting the objective lens system, with the adjusting device setting a sequence of discrete distances between the objective lens system and the image plane. A device is provided which analyzes the auxiliary images, in the form of electrical signals, and contains two CTD image sensors which are individually assigned to the respective auxiliary images and whose linearly aligned image points are arranged in the direction of the shift of the auxiliary image by means of the rotatably mounted mirror. The read-out signals obtained are suitably processed to provide an adjusting signal which causes the distance of the objective lens system to be set to a value at which the difference between the integrated read-out signals has the lowest amplitude.

In accordance with another feature of the invention, two optical devices are provided which are offset relative to one another at right angles to the optical axis, and which supply two auxiliary images, both of which are normally stationary, and two CTD image sensors are provided which are associated with the respective optical devices, the auxiliary images being generally displaced relative to one another, with their image points being linearly aligned and arranged, in parallel relation, in the direction of mutual displacement of the auxiliary images, the output of one of such image sensors being connected directly, or over a constant delay element, to an evaluating circuit and the output of the other sensor being connected to the evaluating circuit over a delay element which can be adjusted in a stepped manner in a predetermined setting sequence. The read-out signals obtained are suitably processed to provide an adjusting signal which causes the objective distance to be set to a value assigned to such delay.

In accordance with a further feature of the invention, such objective is realized by the production of an arrangement of the type referred to in which two optical devices are provided, which are offset relative to one another at right angles to the optical axis, and which supply two auxiliary images, and two CTD image sensors are provided which are associated with the respective optical devices, the auxiliary images being generally displaced relative to one another, with their image points being linearly aligned and arranged, in parallel relation, in the direction of mutual displacement of the auxiliary images, the output of one of such image sensors being connected to a delay line having a plurality mutually offset outputs, and a series of differential amplifiers being provided whose first inputs are connected to respective outputs of the delay line, and whose second inputs are connected to the other image sensor either directly or over a constant delay element, with the outputs of the amplifiers being connected over respective rectifiers and respective following integrators to the inputs of a second evaluating circuit which determines the integration having the smallest output signal and produces an adjusting signal which causes the objective distance to be set to a value assigned to such delay.

The present invention has the particular advantage that the congruency of the two auxiliary images is established by virtue of the identity of two electrical signals which are obtained merely by integrating the brightness values prevailing in one line of the relevant auxiliary image. As a result, the accuracy in the establishment of the congruency is substantially increased in comparison to known arrangements. In particular, a mis-setting of the objective lens system which could result from a random identity of the signals integrated over the entire image content without congruency actually existing between the two auxiliary images, is eliminated. Further, the CTD image sensors can be monolithically integrated with the individual components of the analyzing device on a semiconductor substrate, forming a semiconductor module which effects the automatic focusing, and which can easily be accommodated in the various devices which employ focusing of this type, without requiring a noticeable increase in the space or bulk requirements of the structure.

BRIEF DESCRIPTION OF THE DRAWINGS

In the drawings which illustrate preferred exemplary embodiments of the invention.

DETAILED DESCRIPTION OF THE INVENTION

Figure 1:
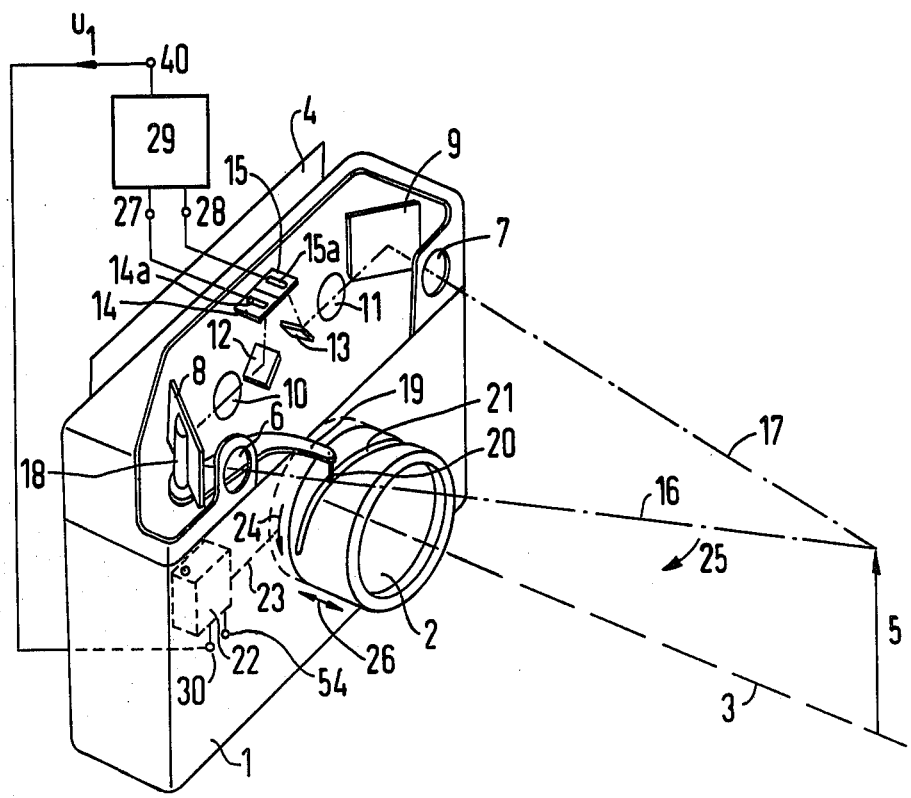
FIG. 1 schematically illustrates the construction of a first exemplary embodiment of the invention.

Referring to the drawings, FIG. 1 represents an arrangement, in accordance with the invention, embodied in a photographic camera. The latter contains an objective lens system 2 which can be retracted and extended in a female mounting which is fixedly carried by the camera housing, whereby the lens system can be adjusted with respect to its distance from an image plane 4, measured in the direction of the optical axis 3. The image plane 4, which actually lies within the camera housing and is determined by the plane in which the light-sensitive material, such as a photographic film, is disposed, for the sake of clarity has been schematically illustrated in FIG. 1 externally of the camera housing. The distance of the objective lens system 2 from the image plane 4 is to be set to a value which is such that an object 5 is focused with maximum definition in the image plane 4. The objective distance is set automatically by means of two optical devices, each of which comprises auxiliary openings or pupils 6 and 7, mirrors 8 and 9, collective lenses 10 and 11, deflection mirrors 12 and 13, and two projection surfaces 14 and 15, with resultant auxiliary images of the object 5 being projected on such projection surfaces. Respective light beams emanating from the tip of the object 5 are designated by reference numerals 16 and 17.

The mirror 8 is carried by a vertical pin 18 which is rigidly connected to a lever 19, the latter having a pin 20 carried by the free-end thereof with the free-end of the pin 20 being disposed in a groove 21, for example a helical groove, formed in the cylindrical outer surface of the mounting of the objective lens system 2. A setting device 22 is operative to rotate the objective lens system 2 about the optical axis 3, by suitable means such as a gear wheel drive 23, diagrammatically illustrated merely by a broken line, which rotation is operative to effect extension and retraction of the lens system in its mounting. If such rotation is effected in the direction of arrow 24 and the distance of the lens system from the image plane 4 is reduced, the mirror 18 rotating in a direction such that the light beam 16 striking the projection surface 14 is rotated in accordance with arrow 25. Consequently, the intersection point of the beams 16 and 17 moves increasingly further away from the camera 1 in a direction parallel with the optical axis 3. The coupling between the longitudinal movement of the objective lens system in the direction of the double arrow 26 and the rotary movement of the mirror 18 is so selected that objects located at the intersection point of the beams 16 and 17 are sharply focused by means of the objective lens system 2 onto the image plane 4, which case is illustrated in FIG. 1 with respect to the object 5. If the beam 16 striking the projection surface 14 is rotated in accordance with the arrow 25 as a result of the rotation of the mirror 8, the intersection point of the beams 16 and 17 moves increasingly further away from the camera 1 parallel to the optical axis 3.

For an adjustment sequence of the objective lens system when the beams 16 and 17 initially have an intersection point in the vicinity of the camera, whereby such intersection point will be moved increasingly further away, a constant auxiliary image of the object 5 is formed on the projection surface 15 whereas the auxiliary image of the object on the projection surface 14 is displaced in a direction at right angles to the image plane 4 in accordance with the rotary movement of the mirror 8. In the event that the beams 16 and 17 are aligned directly on the object 5, as in FIG. 1, the auxiliary images on the projection surfaces 14 and 15 are not displaced relative to one another. The mutual shift of the auxiliary images or the absence of such a shift is analyzed by means of CTD image sensors 14a and 15a whose outputs are designated by reference numerals 27 and 28, with the output signals of the respective sensors being conducted to an evaluating circuit 29, operative to form an adjusting signal $u_1$ which is supplied to an input 30 of the setting device 22, which, in turn, sets the objective lens system to that which sharply focus the object 5 in the film plane 4.

The image sensors 14a and 15a comprise charge transfer devices having a number of image points which are linearly aligned. The longitudinal axes of the two image sensors 14 and 15 are parallel to the displacement direction of the auxiliary image derived over the rotatably mounted mirror 8 and are also aligned to mutually corresponding lines of the auxiliary images which contain a specific point on the object, for example the arrow 5. The design of the image sensors will subsequently describe in further detail with reference to FIGS. 3 and 4.

Figure 2:
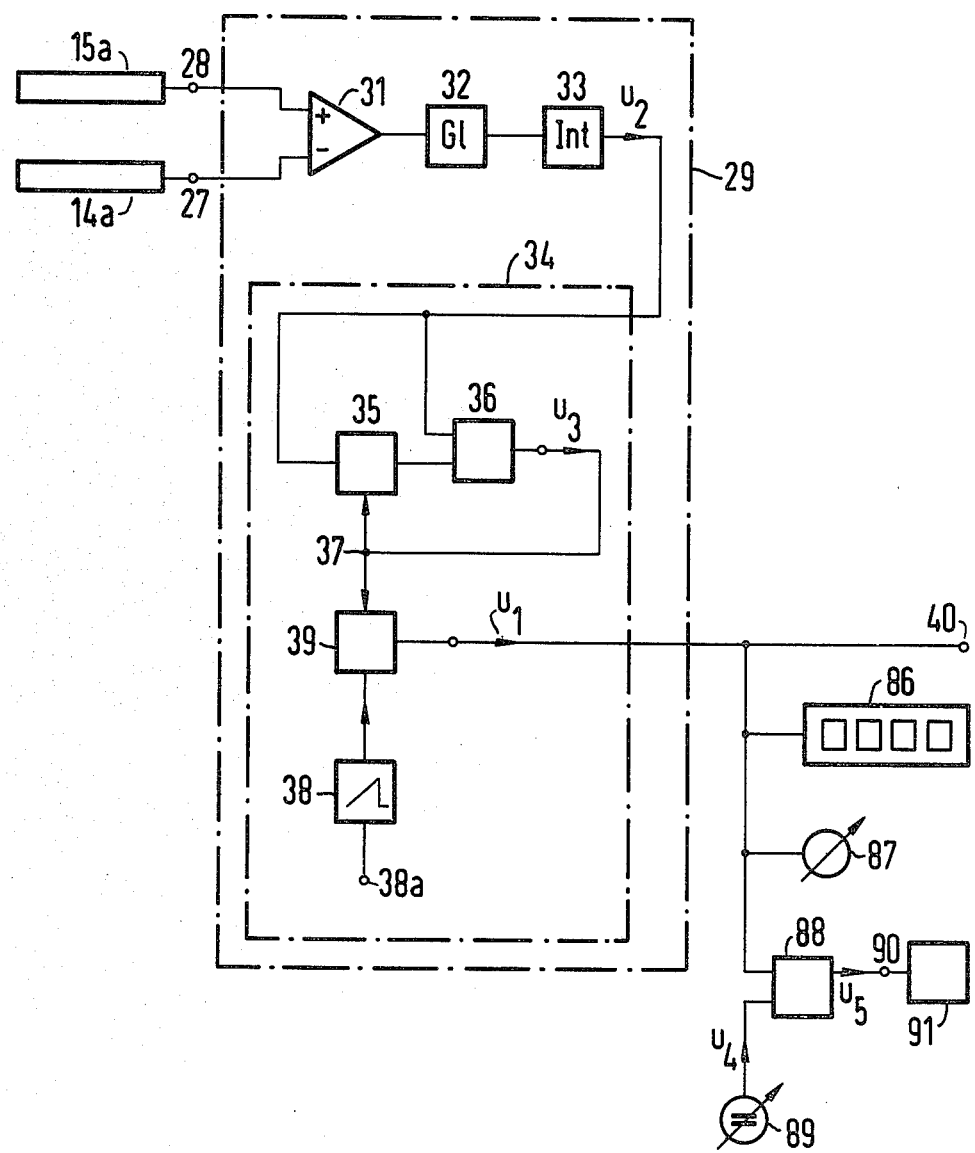
FIG. 2 illustrates the schematic circuitry of the exemplary embodiment of FIG. 1.

As will be apparent from FIG. 2, the image sensors 14a and 15a are provided with respective output terminals 27 and 28 over which the electrical signals formed in the individual image points of the sensors, in dependence upon the local illumination thereof, are sequentially read-out. For each setting of the reflector 8 read-out signals will appear at the outputs 27 and 28, whose time slope corresponds to the illumination of the consecutively read-out image points. The difference signal of such read-out signals is formed in a differential amplifier 3, rectified in a following rectifier 32, and integrated in a subsequent integrator 33. As a result, there will appear at the output of the integrator 33, an integrated read-out signal $u_2$ which corresponds to a mean value, formed from all the image points of the image sensors, of the difference signals of the two sensors derived from corresponding image points.

In dependence upon a sequence of subsequently effected distances of the objective 2 from the image plane 4, a sequence of integrated read-out signals $u_2$ are formed in the manner heretofore described and are supplied to a selection stage 34, in which they are conducted to the signal input of a first scanning stage 35 and to the first input of a comparator 36. A signal at the control input 37 of the scanning stage 35 causes the scanning of the initially occurring signal $u_2$, the storage thereof in such stage, and the switching through of such signal to the output thereof. Consequently, such signal is also present at the second input of the comparator 36. If a second signal $u_2$ now occurs which is smaller than the first, a pulse-like output signal $u_3$ will appear at the output of the comparator 36 which is supplied to the stage 35 over the control input 37 thereof, causing such stage to scan the smaller signal $u_2$ and supply it to the second input of the comparator 36. Each of the signals $u_2$ which is smaller than any of the signals $u_2$ which preceded it in period of the same setting sequence is able, as a result of the control action of the comparator 36 upon the stage 35, to displace the signal $u_2$ previously stored therein and thus serve as a new reference signal for following comparison procedures which take place in the comparator 36. At the end of a setting sequence, the stage 35 stores that integrated read-out signal $u_2$ which possesses the smallest amplitude.

If now, in synchronism with the beginning of the setting sequence, a generator 38 is triggered over the input 38a thereof, and subsequently produces a rising or falling voltage curve, the pulse-like signal $u_3$ which is emitted on the occurrence of the smallest signal $u_2$ initiates the scanning and storage of the amplitude value $u_1$, existing at this time, of the voltage of the generator 38, with the control input of the stage 39 being in common with the control input 37 of the first scanning stage 35. The signal $u_1$ corresponding to the time difference between the occurrence of the integrated read-out signal $u_2$ having the smallest amplitude and the beginning of the setting sequence, can be derived from the output 40 of the selection stage, which simultaneously represents the output of the evaluator circuit 29. At the end of the setting sequence, the signal $u_1$ is supplied to the input 30 of the setting device 22 and initiates an automatic setting of the objective lens system to the distance from the image plane 4 which results in the desired focusing of the object 5.

The components 38 and 39 of the selection stage 34, which can be considered a time measuring device can also be replaced by a time measuring device of different construction. The system would then have the function of measuring the interval of time between the trigger pulse which appears at the terminal point 38a, and which coincides in time with the beginning of the setting sequence, and the occurrence of the signal $u_3$, thereby producing the measurement result in the form of a voltage $u_1$.

Figure 3:
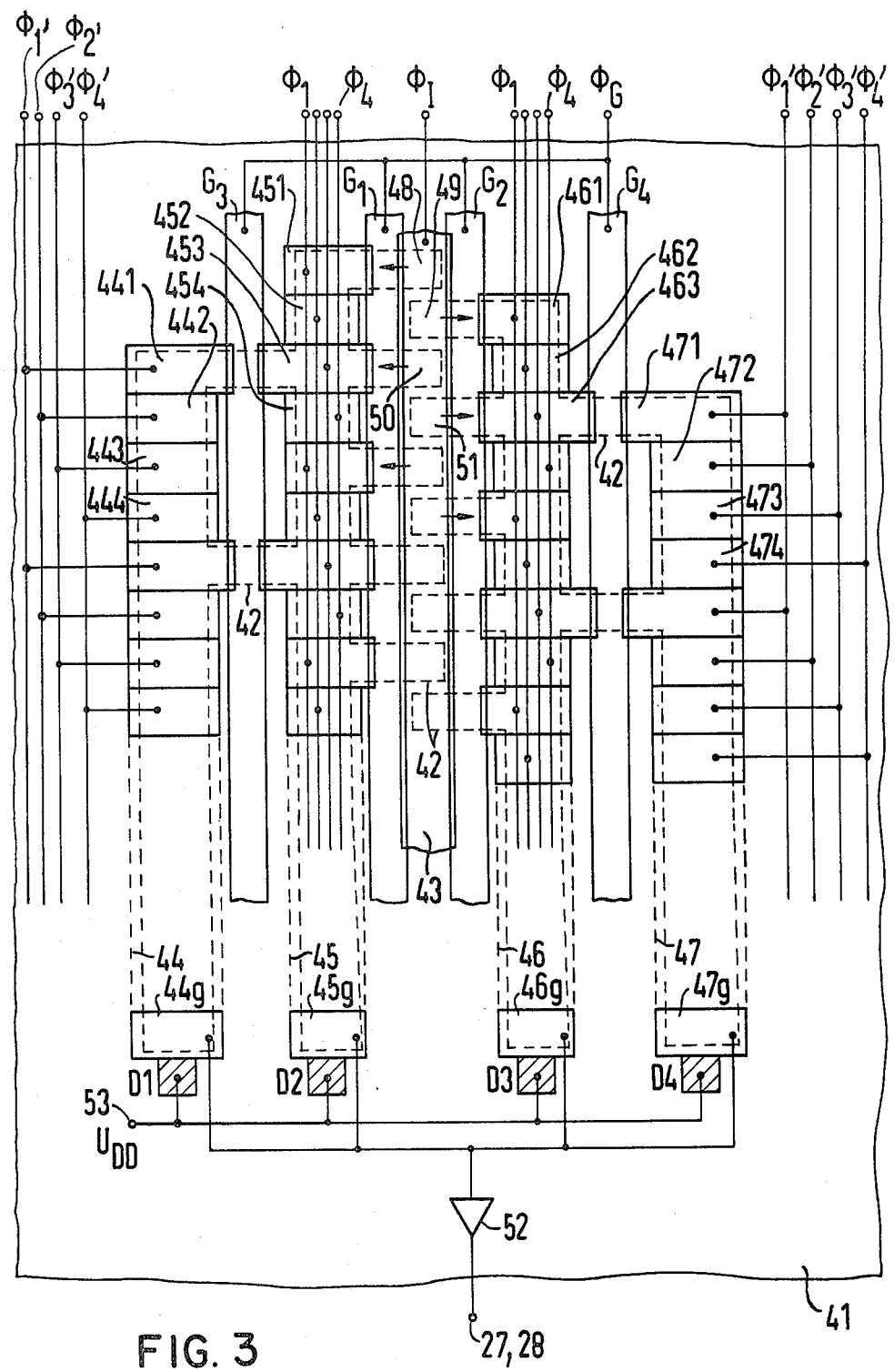
FIG. 3 schematically illustrates a CTD image sensor which can be employed in all of the exemplary embodiments illustrated.

Referring to FIG. 3 which is a plan view of a preferred embodiment of a CTD image sensor, designated by the reference numeral 41, which is integrated on a semiconductor substrate comprising, for example, N-conducting silicon. The substrate surface is covered by an electrically insulating layer which, for example, may comprise $SiO_2$ and which has considerably less thickness within the broken lines 42 than exteriorly thereof. The thinner areas of this layer may also be referred to as gate-oxide zones, whereas the thicker zones may be referred to as field oxide zones. Above the insulating layer is disposed a central electrode 43 at one side of which are rows of electrodes 44 and 45 and at the opposite side of which are rows of electrodes 46 and 47. The electrodes are metallically conductive structures which comprise, in particular, portions of an electrically conductive coating applied to the entire surface which, for example, may comprise polycrystalline, highly doped silicon, or may be a metal layer, as for example aluminum. The electrode 43 and the rows of electrodes 44 to 47 may be produced in conventional manner, as for example, by utilization of a series of photolithographic steps employing masks which define the outlines of the individual structures.

Those points of the semiconductor substrate 41 lying beneath the thin oxide zones and covered by the electrode 43 represent individual image points 48, 49, 50, 51 etc. of the image sensor, and as such points are disposed in a line, an image sensor of this type is referred to as being linear. The electrodes 44 to 47 each comprise individual, closely adjacent electrodes 441, 442, 443, 444 . . . 451, 452, 453, 454 etc. The electrode 451 is disposed at the level of image point 48, electrodes 452 and 461 at the level of image point 49, electrodes 441, 53 and 462 at the level of image point 50, electrodes 442, 454, 463 and 471 at the level of image point 51, etc. Between the rows 45, 46 of electrodes and the electrode 43 are disposed transfer-gate-electrodes $G_1$, $G_2$ which are so disposed that they slightly laterally overlap the firstmentioned electrodes but are electrically insulated therefrom by an intermediate insulating layer. Likewise, between the rows 44 and 45 of electrodes and between the rows 46 and 47 of electrodes are arranged further transfer-gate-electrodes $G_1$ and $G_4$, respectively. The electrode 43 is connected over a terminal to a pulse voltage $\phi_I$, while the transfer-gate-electrodes $G_1$ to $G_4$ are connected over a common terminal to a pulse voltage $\phi_G$.

Each fourth electrode 451, 454, etc. of the row 45 is connected over a common line to a pulse voltage $\phi_I$, while each fourth electrode 452, 455 is connected to a common line which carries a pulse voltage $\phi_2$. In like manner each fourth electrode 453 etc. is connected to a line carrying the pulse voltage $\phi_3$ and each fourth electrode 454 etc. is connected to a line carrying the pulse voltage $\phi_4$. Similarly, the individual electrodes of row 46 are connected to the pulse voltages $\phi_1$ to $\phi_4$, while the electrodes of rows 44 and 47 are connected to the pulse voltage $\phi_{1'}$ to $\phi_{4'}$.

The electrodes of each row 44 to 47 form part of a charge transfer device pulsed by the pulse voltages $\phi_1$ to $\phi_4$ and $\phi_{1'}$ to $\phi_{4'}$. The electrodes 44g to 47g, illustrated at the bottom end of each row of electrodes, represent so-called "floating gate" electrodes which are free of the pulse train voltage but are connected to a common input of an amplifier 52, with such electrodes being followed at the output-side by diffusion zones $D_1$ to $D_4$, which are connected over a common terminal 53 to a drain voltage $U_{DD}$.

Figure 4:
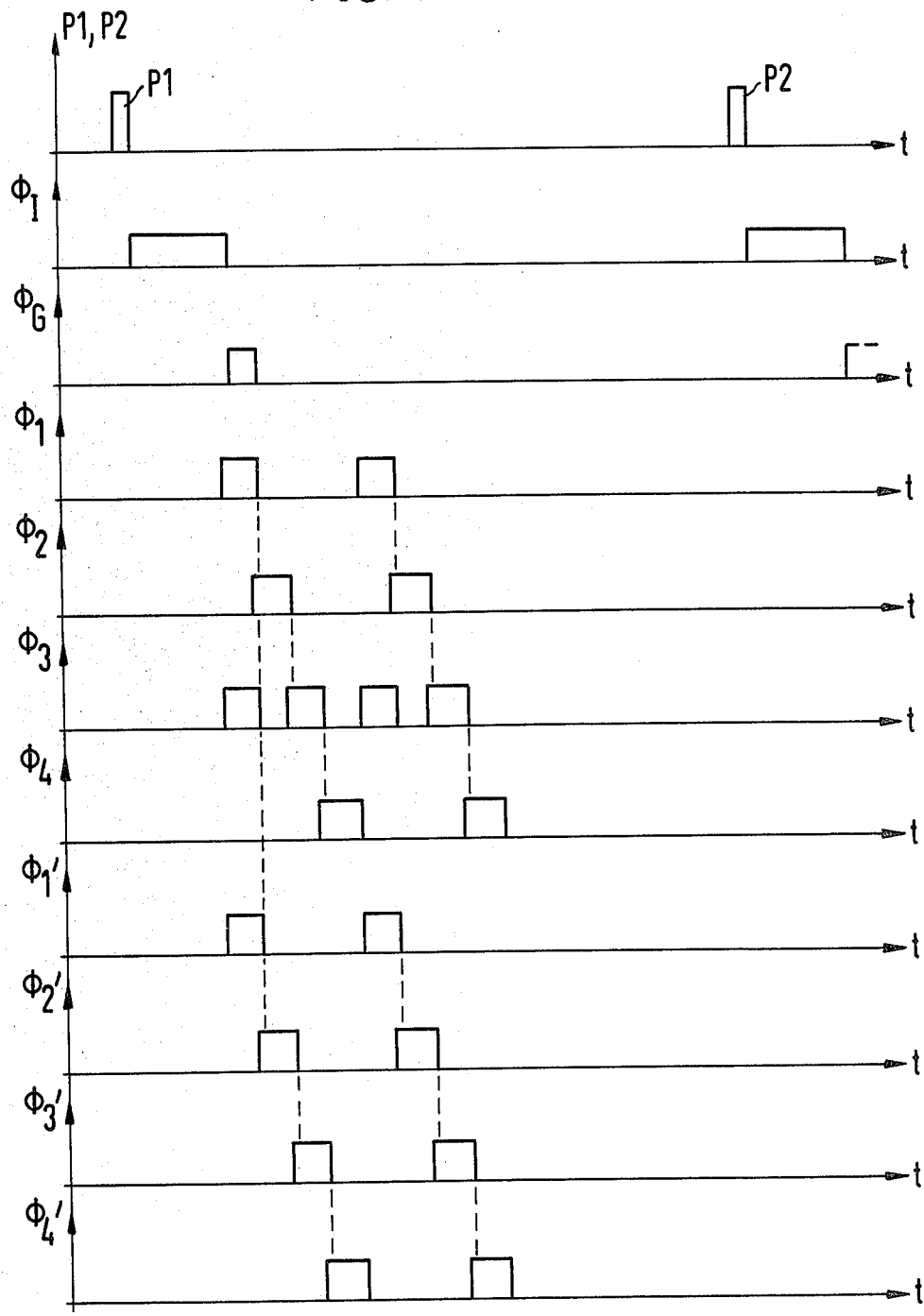
FIG. 4 is a time diagram which illustrates the operation of the exemplary embodiment shown in FIGS. 1 and 2, in combination with a CTD image sensor such as illustrated in FIG. 3.

In the operation of the system, following the occurrence of a pulse P1 which is supplied to an input 54 of the setting device 22, the object lens system 2 is thereby set relative to the image plane 4, to a first discrete distance x of a setting sequence, and a pulse $\phi_I$ is connected to the electrode 43 which determines the so-called integration period of the image sensors 14a and 15a, designed in accordance with FIG. 3. Within this integration time, under the influence of the optical illumination, electrical charges corresponding in value to the particular local illumination intensity accumulate at the image points 48 to 51. A transfer gate pulse $\phi_G$ ensures that these charges are displaced, at the end of the integration period, in the direction of the arrows out of the image points into the area of the charge transfer devices 44 to 47. In other words, the charge formed beneath the area 48 is displaced beneath the electrode 451, the charge formed beneath the area 49 is displaced beneath the electrode 461, the charge formed beneath the area 50 is displaced beneath the electrode 441, and the charge formed beneath the area 51 is displaced beneath the electrode 471. The shift pulse trains $\phi_1$ to $\phi_4$ and $\phi_{1'}$ to $\phi_{4'}$ occurring at times as illustrated in FIG. 4, ensure that the electrical charges, following passage through the charge devices, are advanced in stepped fashion beneath the electrodes 44g to 47g and finally reach the diffusion zones $D_1$ to $D_4$. The potential shifts taking place across the electrodes 44g to 47g are transferred to the output 27 for the sensor 14a and to output 27 for the sensor 15a where they produce read-out signals, which comprises consecutively occurring pulse-like components corresponding to the illumination intensities in the consecutively read-out image points during the integration time.

A pulse $P_2$ supplied to the input 54 of the setting device 22 effects a setting to the next value x within the same setting sequence, following which a further pulse $\phi_I$ defines the integration period assigned to this setting. This integration period can also coincide with the displacement of the charges, formed in the preceding integration period, across the charge transfer devices 44 to 47.

An image sensor of the type above described is described in detail in German Pat. No. 2,553,658. One way in which such exemplary embodiment of a CTD image sensor can be simplified is to eliminate the charge transfer devices 44 and 47 and effect a read-out merely over the devices 45 and 46, thus reducing the number of read-out image points by half, namely to the points 48, 49 and to the points which are spaced from these points by a distance corresponding to a multiple of four image point intervals. An image sensor of this kind is described, for example, in the publication "IBM Technical Disclosure Bulletin", Vol. 16, No. 1, June 1973, pages 173 and 174. It might be mentioned that in lieu of the charge transfer devices 44 to 47 which are to be considered as SCCD devices facilitating charge transport directly beneath the substrate surface, or BCCD devices facilitating charge transport inside the substrate, it is possible within the scope of the present invention to utilize bucket chain circuits, known per se (BBD). Both systems of charge transfer devices are described, for example, in the book "Charge Transfer Devices", by Sequin and Tompsett, Academic Press, New York, 1975, pages 1 to 18.

It will also be appreciated that it is possible, instead of utilizing charge transfer devices operating with four-phase operation, to employ devices which operate, in known manner, in two-phase or three-phase operation. Further, the central electrode 43 of FIG. 3 can also be divided into a row of electrodes corresponding to the parts 44 to 47, in which case all the electrodes in this row are initially supplied with a common pulse $\phi_I$ which defines the integration time, whereupon the individual electrodes are supplied with the shift pulses $\phi_1$ to $\phi_4$ as illustrated in FIG. 4. However, it should be noted that only the image points lying beneath each fourth electrode are illuminated. In the lastmentioned example, the amplifier 52 would be connected to the lower part of the electrode 43, which then represents a floating-gate electrode, and the charge devices 44 to 47 are omitted. In this case a continuous gate oxide zone is disposed beneath the split electrode 43.

Assuming that each electrode in the respective rows of electrodes 44 to 47 has a length of 10 $\mu$m, and 100 elements or image points 48, 49 etc. are provided, the length of the image sensors 14a and 15a will be 1 mm. In this case, a read-out time of 0.1 ms corresponds to a repetition frequency of the shift pulse trains $\phi_1$ to $\phi_4$ of 1 MHz. Further, assuming that the integration time is on the order of 10 ms, the read-out time is negligible by comparison. Thus, a setting sequence of 50 individual steps, each of which must be assigned an integration time of 10 ms, has a time requirement of approximately 0.5 seconds. At the end of this period, the evaluating circuit 29 has determined the signal $U_1$ which automatically sets the system at the optimum distance x of the objective lens system from the image plane 4.

Figure 5:
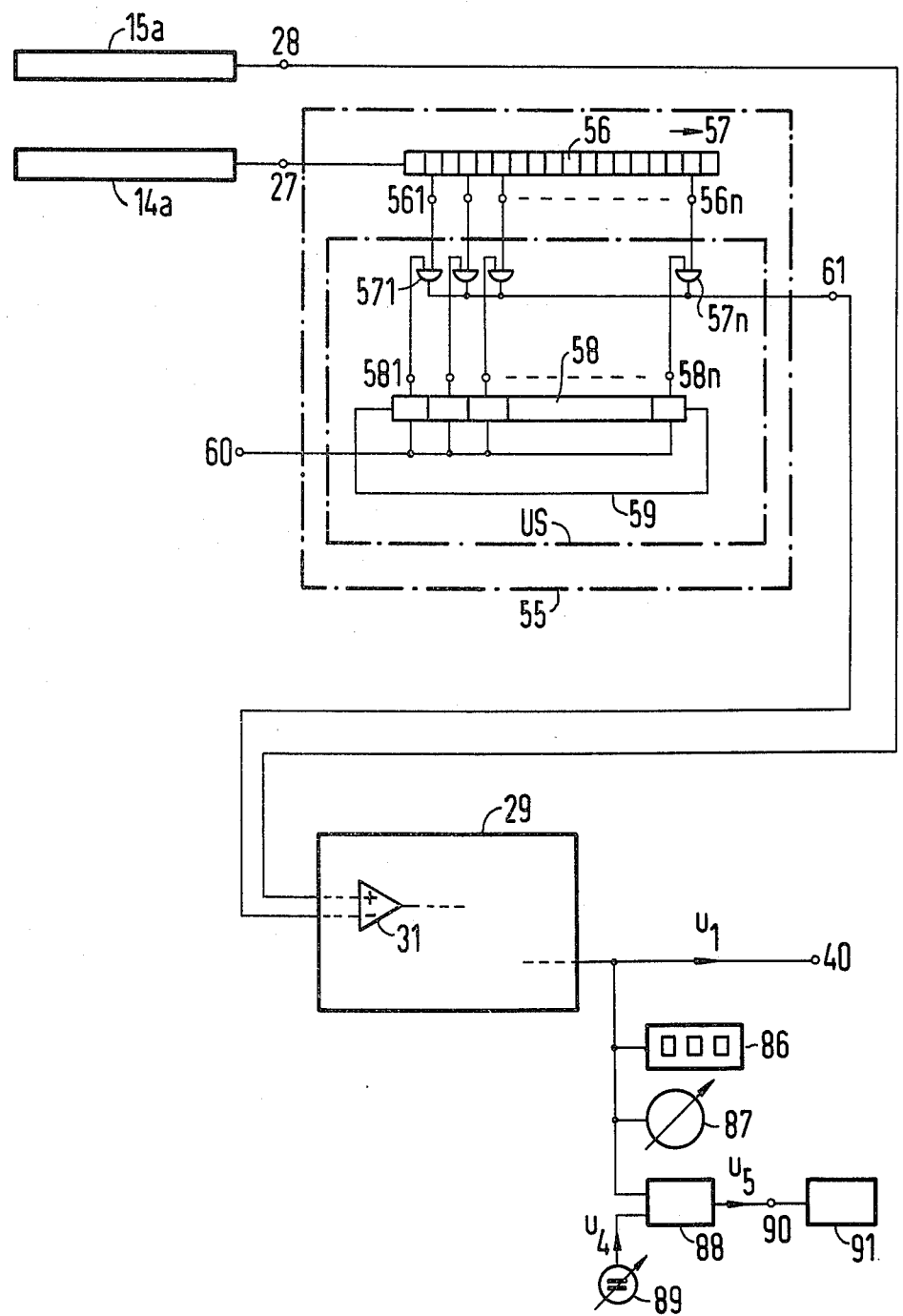
FIG. 5 is a schematic diagram illustrating the circuitry of a second exemplary embodiment.

FIG. 5 illustrates a second exemplary circuit embodiment of the invention, utilizable with the structure of FIG. 1, which differs from the first embodiment primarily in the utilization of a mirror 8 which is stationary and the components 19, 20 and 22 have been omitted. In this arrangement the rotatable mirror 8 is replaced by a delay element 55 which can be adjusted in a stepped manner and which operatively follows directly after the sensor output 27. The circuit of FIG. 5 otherwise corresponds to that of FIG. 2.

The delay element 55 comprises a shift register 56, to the input of which is supplied the pulse-like components of the read-out signal of the image sensor 14a appearing at the output 27 thereof in the serial sequence in which they occur. The analog signal values derived from the individual image points of the image sensor 14a are then displaced in the shift register 56 in the direction of arrow 57. Individual stages of the shift register 56, which are equidistant from one another, are connected over outputs $56_1$ to $56_n$ to the first input of a series of AND-gates $57_1$ to $57_n$ the second inputs of each being connected to the output $58_1$ to $58_n$ of the stages of a shift register 58, the last stage of which is connected over a line 59 to the signal input of the first stage.

A logic signal, characterized by a high voltage value, is input into the shift register 58, which is displaced into the next stage whenever a timing pulse occurs at the input 60, and thus is supplied to the pulse train inputs of the stages over a common line. With the exception of the stage which stores such logic signal all other stages of the shift register 58 are supplied with logic signals characterized by a low voltage value. The output which is supplied with the high voltage logic signal, i.e. one of the outputs $58_1$ to $58_n$, switches through one of the outputs $56_1$ to $56_n$ to the output 61 of the delay element over the corresponding AND-gate. Upon the occurrence of the next timing pulse at the input 60, it is replaced by the next output of 56 considered in the direction of arrow 57.

The read-out signals of the image sensor 14a which are entered in the shift register 56 are thus delayed in an adjustable manner, the degree of delay being dependent upon that stage of the shift register which is supplied with the individual high voltage logic signal. The read-out signal which has been so delayed in a stepped manner is thus supplied, together with the read-out signal derived from the image sensor 15a over the output 28, and possibly a following constant delay element, to the two inputs of a differential amplifier 31 which represents the input stage of the evaluator circuit 29 previously described with respect to the circuit of FIG. 2.

Particularly advantageously, the shift register 56 comprises a charge transfer device such as that represented, for example, in FIG. 3 and designated by the reference numeral 44. The input stage of a charge transfer device of this type, which consists of an input zone which is doped oppositely to the semiconductor substrate and is referred to as a diode input, and the first two electrodes, i.e. 441 and 442 of FIG. 3, is designed in accordance with FIG. 3.12 on page 49 of the book "Charge Transfer Devices" by Sequin and Tompsett, Academic Press, Inc., New York 1975. The individual outputs 561 to 56n are formed by "floating gate" electrodes which simultaneously represent the gate electrodes of output field effect transistors. This type of output coupling is described in detail in association with FIG. 3.14(c) on page 53 of the aforementioned book by Sequin and Tompsett.

If it is assumed that the shift register 56 contains a series of electrodes 441 to 444, etc., in accordance with FIG. 3, which, in the manner described, are supplied with timing pulse voltages $\phi'_1$ to $\phi'_4$ four consecutive electrodes, i.e. 441 to 444, belong to one stage of the shift register 56. The floating gate electrode which represents a part of the output of such stage then lies beneath one of the four electrodes belonging to such a stage.

If it is assumed that the pulse P1 (FIG. 4) is supplied to the input 60 of the circuit of FIG. 5, and switches the output 581 of the shift register 58 to a high voltage level, the signal from the image sensor 14a which is formed on the expiration of an integration time determined by a pulse $\phi_I$, and is read-out over the output 27 at the output 561 during the stepped advancement across the shift register 56, and thus with the lowest possible degree of delay. At the end of the read-out operation, the input 60 is supplied with the pulse P2, which switches over the image sensor 14a, formed in a following integration operation, and is read-out over the output 27 to the next output which follows 561, so that it is read out with the next greater degree of delay. A sequence of timing pulses P1, P2, etc. at the input 60, together with a synchronous sequence of pulses $\phi_I$ supplied to the middle electrode 43 of the image sensor 14a, at the circuit points 28 and 61, lead to the acquisition of the same sequence of read-out signals obtained in the circuit shown in FIG. 2 at the circuit points 27 and 28. The setting sequence in accordance with which the delay element 55 in FIG. 5 is set to different delay values, thus replaces the setting sequence in which the distance of the objective lens system 2 must be shifted with respect to the image plane 4 for the production of the read-out signals in an arrangement as shown in FIGS. 1 and 2.

The signal $u_1$, formed in the described manner, following the end of the setting sequence, in the evaluating circuit 29, appearing at the output 40 and supplied to the input 30 of the setting device 22, thus effects a mechanical setting motion of the objective lens system 2 whereby the latter is brought into its optimum distance relative to the image plane 4, to ensure the desired focusing of the object 5.

Figure 6:
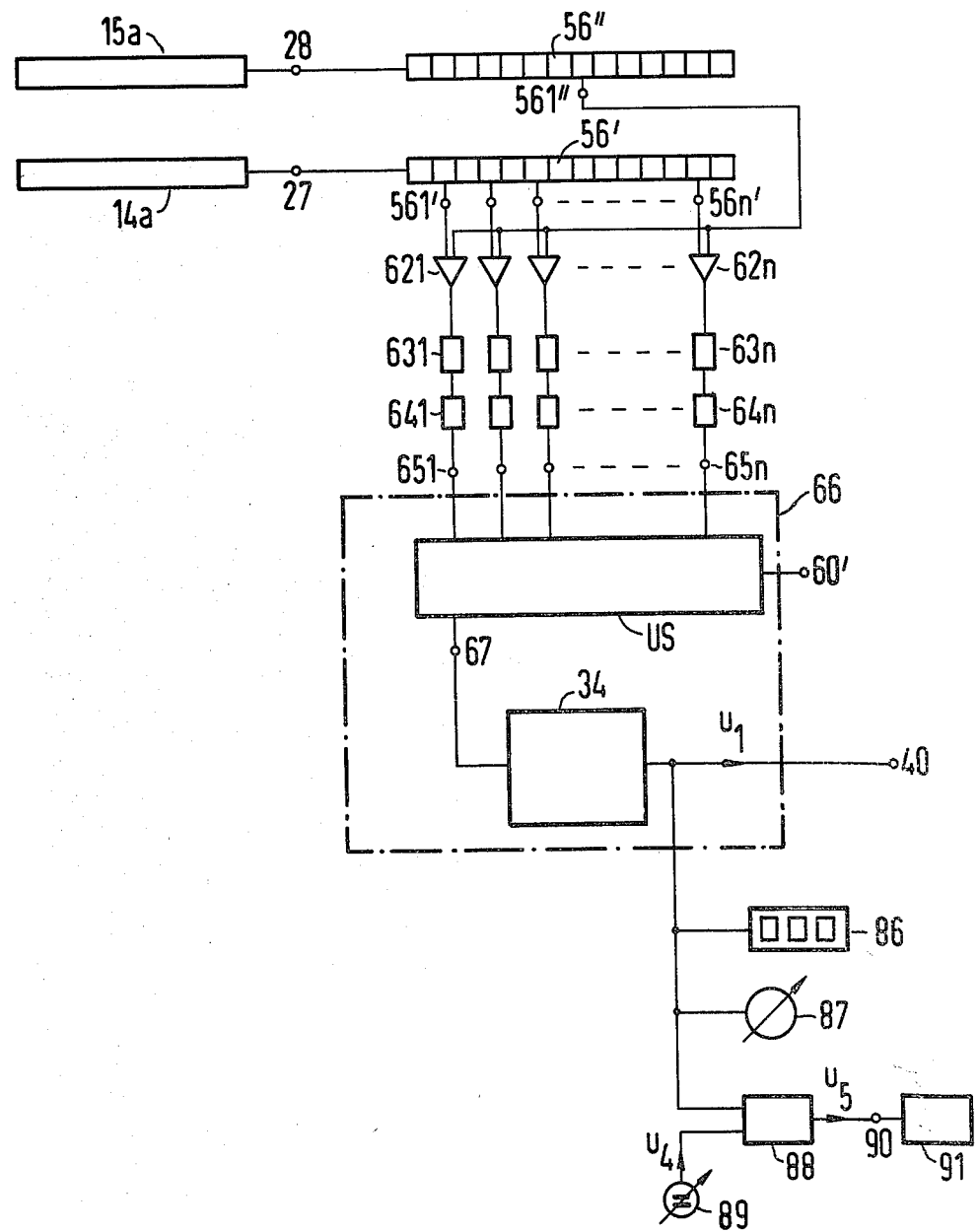
FIG. 6 is a schematic view illustrating the circuitry of a third exemplary embodiment.

FIG. 6 illustrates a third exemplary embodiment of the invention which is also based on a mechanical arrangement as illustrated in FIG. 1 but which likewise employs a stationary mirror 8 with the accompanying omission of the coupling parts 19 to 21 between the mirror 8 and the objective lens system 2. In this arrangement the output 27 of the image sensor 14a is followed by a delay line 56' whose input is supplied in serial manner with the consecutively read-out pulse components of the image sensor signal. Preferably the delay line comprises a charge transfer device as previously described in connection with the device 56 of FIG. 5.

The outputs 561' to 56n', provided in accordance with FIG. 5, are in this case connected to the first inputs of a series of differential amplifiers 621 to 62n, while the output 28 of the image sensor 15a is connected to the input of a delay line 56'' which advantageously may employ a construction similar to the delay line 56', and in particular likewise comprise a charge transfer device such as previously described in connection with the component 56 of FIG. 5. In contrast to the delay line 56', the delay line 56'' possesses only one output 561'' which is connected to the second inputs of all the differential amplifiers 621 to 62n. The outputs of the differential amplifiers 621 to 62n are connected over individual cooperable rectifiers 631 to 63n and serially following integrators 641 to 64n to circuit points 641 to 65n which represent the inputs of a second evaluator circuit 66. The latter includes a switch-over device US which corresponds to that illustrated in FIG. 5 and consecutively switches through the inputs 651 to 65n to a common output 67, connected to the input of a selection stage 34, which has previously been described in connection with FIG. 2. The output 40 of the selection stage 34 then supplies an adjusting signal $u_1$, which in turn is supplied to the input 30 of the setting device 22 of FIG. 1 for the purpose of setting the objective lens system 2 at the optimum focusing distance from the image plane 4.

In the exemplary embodiment illustrated in FIG. 6, after an integration time determined by a pulse $\phi_I$, read-out signals which are delayed in stepped fashion relative to one another are derived virtually simultaneously from the image sensor 14a over all the outputs 561' and 56n' and are each processed in the differential amplifiers 621 to 62n with a read-out signal from the image sensor 15a which is obtained over the output 561'' of the delay element 56'' to form difference signals. Following rectification in the rectifiers 631 to 63n and integration over all the pulse components belonging to a read-out operation of the image sensors 14a and 15a, which is carried out in the integrators 641 to 64n, these difference signals are available substantially simultaneously at the circuit points 651 to 65n, as integrated read-out signals.

In contrast to the preceding exemplary embodiments, one signal integration period of the image sensors 14a and 15a is sufficient in the example of FIG. 6 for producing all of the read-out signals which, in accordance with FIGS. 2 and 5, are produced by a series of integration periods which are synchronous to the individual steps of the setting sequences of the objective systems and the various delay values. Consequently, the arrangement illustrated in FIG. 6 operates considerably more rapidly than the arrangements illustrated in FIGS. 2 or 5. The integrated read-out signals which are available at the inputs 651 to 65n can be very rapidly switched in turn to the output 67 by means of the switch-over device US, which is achieved by an appropriately high repetition frequency of the timing pulses supplied to the input 60'. The selection stage 34 pocesses the consecutively arriving integrated read-out signals in the manner above described to form the voltage $u_1$ which is supplied to the setting device 22 as the setting value.

Figure 7:
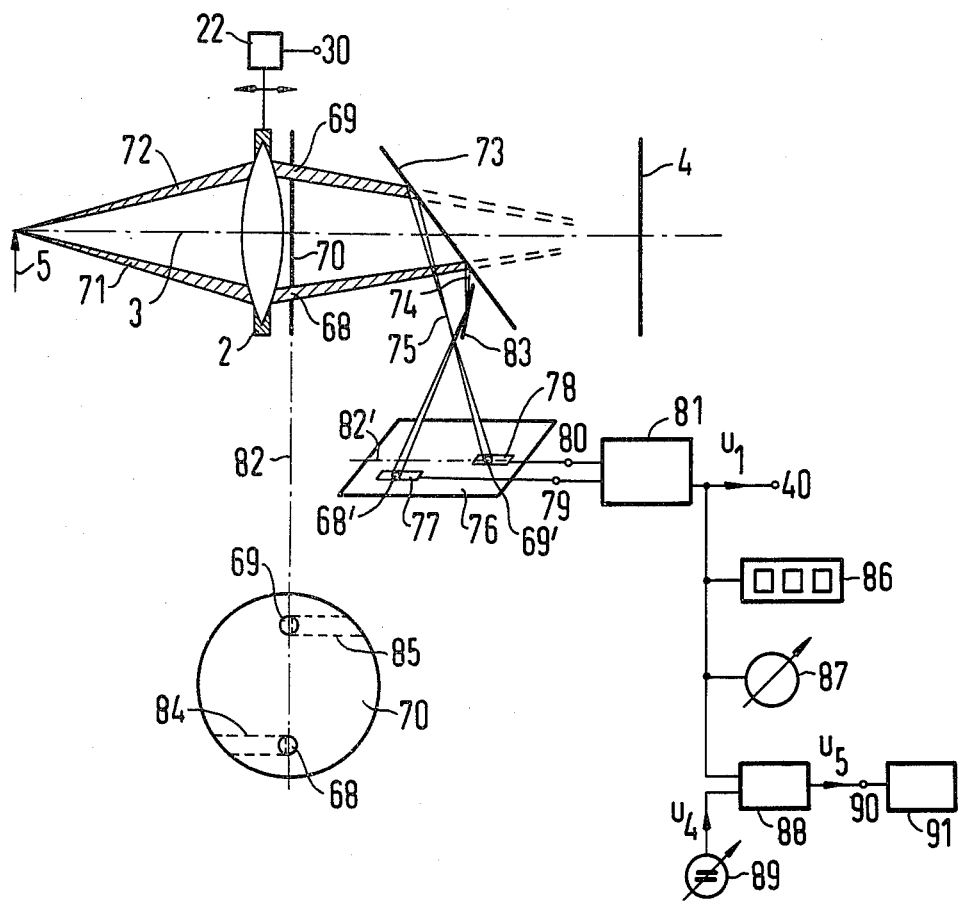
FIG. 7 is a schematic illustration of a further exemplary embodiment.

FIG. 7 schematically illustrates a further exemplary embodiment of the invention. In this arrangement two optical devices are vertically offset relative to the optical axis 3 of the lens system 2, and comprise two subsidiary pupillar openings 68 and 69 of the objective lens system 2. In the embodiment illustrated, a diaphragm 70 is provided which as corresponding openings. The groups of light beams which emanate from the object 5 and traverse the subsidiary pupillar openings 68 and 69 are designated by reference numerals 71 and 72. Components 74 and 75 of such groups of light beams are partially reflected by means of a partially silvered mirror 73 and projected onto an auxiliary plane 76 which is displaced relative to an image plane, and in which two linear CTD image sensors 77 and 78 are arranged. The term image plane is to be understood as a plane under which the object 5 is focused with maximum definition. The outputs 79 and 80 of the image sensors are connected to an analyzing device 81 whose output 40 is connected to the input 30 of the setting device 22. The CTD image sensors are designed in the manner previously described.

In FIG. 7 the diaphragm 70 is shown as being rotated about a vertical axis 82 in the image plane and displaced downwards. When the subsidiary pupillar openings 68 and 69 are offset relative to one another in the direction of the axis 82, it is expedient to provide a reflector or a prism surface 83 in the path of one of the groups of beams 74 or 75 whereby the same is additionally deflected. This measure merely ensures that the images 68' and 69' which are derived over the subsidiary pupillar openings 68 and 69 are laterally offset in the auxiliary plane 76 relative to the projection axis 82' of the axis 82 so that the CTD image sensors 77 and 78 are correspondingly offset from one another. As a result, even in the case of a small interval of the subsidiary pupillars in the direction of the axis 82 they can readily be disposed one adjacent the other in the auxiliary plane 76. If, on the other hand, the subsidiary pupillar openings are formed by openings 84 and 85, indicated in broken lines, lying only on one side of the axis 82, it is possible to dispense with the reflector or prism surface 83.

The analyzing device 81 of FIG. 7 can be designed in accordance with FIGS. 2, 5 or 6. When designed in accordance with FIG. 2, the setting device 22 is actuated by trigger pulses supplied over the input 54 thereof to set a sequence of discrete distances of the objective lens system 2 relative to the image plane 4, in order to obtain a sequence of read-out signals at the sensor outputs 79 and 80. If the analyzing device is designed in accordance with FIGS. 5 or 6, a mechanical setting sequence of this type is omitted and is replaced by an electrical setting sequence of the delay element 55, which can be adjusted in stepped fashion in accordance with FIG. 5, or a switching sequence of the switch-over device US of FIG. 6. In either case the adjusting signal $u_1$, obtained during the setting or switching sequence, causes the objective 2 to be brought from a determinate starting position, expediently at the beginning or end of the overall setting range, into the optimum distance from the image plane 4 at which optimum focusing of the object 5 is achieved.

In accordance with a preferred further development of the principle of the invention, following each automatic focusing by an adjusting signal $u_1$, the setting device 22 or the delay element 55, or the switch-over device US is retriggered, resulting in a new setting sequence or switching sequence which again leads to an adjusting signal $u_1$. In this way it is possible to regulate the objective distance required for optimum focusing of an object 5 which is moving relative to the object 2. This is subject to the condition that the relative speed between the components 2 and 5 should not exceed a limit value governed by the duration of a setting cycle.

In each of the described exemplary embodiments illustrated in FIGS. 2, 3, 5 and 6, the analyzing device can be constructed in integrated circuit technique and, in particular, can be assembled in the form of a monolithic semiconductor module, possibly including further semiconductor circuits involved in automatic exposure or electric diaphragm or shutter control of a photographic camera.

In all the exemplary embodiments of the invention, the adjusting signal $u_1$ can be used not only to set the optimum objective distance from the image plane, but also to enable a display of the distance of the object 5 from the objective lens system 2, or from the arrangement in accordance with the invention. For this purpose the signal $u_1$ is fed to a digital display device 86 or an analogue display device 87. Another possibility of analyzing the distance consists in comparing the adjusting signal $u_1$ in a comparator 88 with a reference signal $u_4$ supplied by a voltage source 89 which is adjustable, and employing a signal $u_5$ which occurs when voltage equality exists at the output 90 of the comparator in order to display the fact that the object 5 has reached the given distance from the objective lens system 2.

When a double comparison is carried out between the adjusting signal $u_1$ and two reference signals $u_4$ of different values, upon movement of the object 5, a speed measurement can be derived from the interval of time between the two occurring signals $u_5$ by means of a time measuring device 91. In this case the interval of time expediently can be measured in a digital manner.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. In an arrangement for focusing the image of an object onto an image plane, wherein the image is derived over an objective lens system which can be adjusted, with respect to its distance from the image plane, by means of a setting device, and in which two optical devices are provided which are offset from one another transversely to the optical axis and supply two auxiliary images of the object, with a device being provided which analyzes the auxiliary images, in the form of electrical signals, and serves to control the setting device, the combination of the analyzing device containing two CTD image sensors which are individually assigned to the auxiliary images, and whose aligned image points are arranged parallel to one another and in the direction of mutual displacement of the auxiliary images, an evaluating circuit, having one input to which the output of one CTD image sensor is operatively connected, and a second input to which the output of the other image sensor is connected over a delay element which can be adjusted, in a stepped manner, in a setting sequence, for forming from the difference between a sequence of read-out signals from the two image sensors assigned to the setting sequence, a sequence of read-out signals integrated over said image points, and means in said evaluating circuit for forming an adjusting signal in correspondence to such read-out signals, which is characteristic of the delay set on the occurrence of the integrated read-out signal having the smallest amplitude, and which causes the objective distance to be set to a value assigned to such delay.

2. An arrangement according to claim 1, wherein the output of said one image sensor is directly connected to the cooperable input of said evaluating circuit.

3. An arrangement according to claim 1, wherein the output of said one image sensor is connected to the cooperable input of said evaluating circuit over a constant delay element.

4. An arrangement according to claim 1, wherein said evaluating circuit includes a selection stage for determining the time of occurrence of the integrated read-out signal of the smallest amplitude within a setting sequence, and coding such time into an electrical value which comprises the adjusting signal and which corresponds to the time difference relative to the beginning of the setting sequence.

5. An arrangement according to claim 1, wherein the CTD image sensors each include a read-out device in the form of a charge transfer device.

6. An arrangement according to claim 1, wherein said optical devices process subsidiary pupillar openings of the objective, which define two different pupillar areas thereof, being provided with means for gating the groups of beams, which enter such pupillar areas, out of the beam path of the objective and projecting them onto an additional image plane.

7. A method of operating the arrangement as claimed in claim 1, wherein the adjustable delay element is subjected to repeated setting sequences, and that following each setting sequence the objective lens system is set to the objective distance governed by the adjusting signal thereby determined.

8. An arrangement according to claim 1, wherein the evaluating circuit consists of a semiconductor circuit which, in particular, is monolithically integrated on a semiconductor substrate.

9. An arrangement according to claim 1, wherein said delay element comprises a CTD arrangement, the stages of which are provided with respective outputs, and a switch-over device which connects such lastmentioned outputs in the sequence in which they are arranged consecutively to the output of the delay element.

10. An arrangement according to claim 9, wherein the switch-over device comprises a series of AND-gates, the first inputs of which form the inputs of the switch-over device and the outputs of which are connected in parallel with one another, and a shift register, the second inputs of such gates being connected to the individual outputs of said shift register, in which register an individual logic signal characterized by a relatively high voltage value can be shifted.

11. An arrangement according to claim 1, wherein the output of the evaluating device is connected to a measuring device visually displaying the distance of the object from the arrangement.

12. An arrangement according to claim 11, wherein the measuring device is designed in such manner that the reaching of a given distance by the object can be selectively determined.

13. An arrangement according to claim 11, wherein the measuring device comprises means for determining the interval of time between the points at which the object reaches two given distances.

14. In an arrangement for focusing the image of an object onto an image plane, wherein the image is derived over an objective lens system which can be adjusted, with respect to its distance from the image plane, by means of a setting device, and in which two optical devices are provided which are offset from one another transversely to the optical axis and supply two auxiliary images of the object, with a device being provided which analyzes the axiliary images, in the form of electrical signals, and serves to control the setting device, the combination of the analyzing device containing two CTD image sensors which are individually assigned to the auxiliary images, and whose aligned image points are arranged parallel to one another and in direction of mutual displacement of the auxiliary images, the output of one CTD image sensor being connected to a first delay line having a plurality of mutually offset outputs, a series of differential amplifiers respectively having first inputs to which said outputs of said first delay line are connected, and respectively having second inputs operatively connected in common to the output of the other CTD image sensor, an evaluating circuit having respective inputs, each of the outputs of said amplifiers being connected to a corresponding one of said inputs of said evaluating circuit by a rectifier and a serially connected integrator, said evaluating circuit having means for determining the integrator having the smallest output signal and means for producing an adjusting signal which is characteristic of said smallest output signal and causes a setting to an objective distance assigned thereto.

15. An arrangement according to claim 14, wherein the CTD image sensors each include a read-out device in the form of a charge transfer device.

16. An arrangement according to claim 14, wherein said optical devices possess subsidiary pupillar openings of the objective, which define two different pupillar areas thereof, being provided with means for gating the groups of beams, which enter such pupillar areas, out of the beam path of the objective and projecting them onto an additional image plane.

17. A method of operating the arrangement as claimed in claim 14, wherein the switch-over device of the evaluating circuit is subjected to repeated switching sequences, and that following each switching sequence the objective lens system is set to the objective distance governed by the adjusting signal thereby determined.

18. An arrangement according to claim 14, wherein the evaluating circuit consists of a semiconductor circuit which, in particular, is monolithically integrated on a semiconductor substrate.

19. An arrangement according to claim 14, wherein said evaluating circuit includes a selection stage and a switch-over device having inputs forming the inputs of said evaluating circuit and which connects each of its inputs individually and in accordance with a given time switching sequence to the input of said selection stage the latter comprising means for determining the time of the occurrence of the integrated output signal having the smallest amplitude within a switcing sequence and coding this time into an electrical value which comprises the adjusting signal and which corresponds to the time difference relative to the beginning of the switching sequence.

20. An arrangement according to claim 19, wherein the switch-over device comprises a series of AND-gates, the first inputs of which form the inputs of the switch-over device and the outputs of which are connected in parallel with one another, and a shift register, the second inputs of such gates being connected to the individual outputs of said shift register, in which register an individual logic signal characterized by a relatively high voltage value can be shifted.

21. An arrangement according to claim 19, wherein said selection stage comprises two scanning stages, a comparator, and a triggerable generator which supplies a rising or falling voltage curve, the signal input of the first scanning stage, the first input of the comparator forming a common input of the selection stage, the output of the first scanning stage being operatively connected to the second input of the comparator, with the comparator output being connected to the control inputs of the two scanning stages, the signal input of the second scanning stage being connected to the generator, and the output of the second scanning stage forming the output of the evaluation circuit.

22. An arrangement according to claim 14, wherein the output of the evaluating device is connected to a measuring device visually displaying the distance of the object from the arrangement.

23. An arrangement according to claim 22, wherein the measuring device is designed in such manner that the reaching of a given distance by the object can be selectively determined.

24. An arrangement according to claim 22, wherein the measuring device comprises means for determining the interval of time between the points at which the object reaches two given distances.

* * * * *